US00RE40093E

(19) United States
(12) Reissued Patent
Cooper et al.

(10) Patent Number: US RE40,093 E
(45) Date of Reissued Patent: Feb. 26, 2008

(54) COMPRESSOR TEST KIT

(75) Inventors: Ian Cooper, Gloucestershire (GB); Leslie Howard Davis, Gloucestershire (GB); Peter Gray Sedgwick, Gloucestershire (GB)

(73) Assignee: Ultra Electronics Limited, Greenford (GB)

(21) Appl. No.: 29/269,989

(22) Filed: Dec. 12, 2006

Related U.S. Patent Documents

Reissue of:
(64) Patent No.: Des. 516,927
Issued: Mar. 14, 2006
Appl. No.: 29/200,424
Filed: Feb. 27, 2004

(30) Foreign Application Priority Data

Aug. 29, 2003 (GB) ..... 000069737

(51) LOC (8) Cl. ..... 10-04
(52) U.S. Cl. ..... D10/83
(58) Field of Classification Search ..... D10/83–85; 73/37, 146.8; 141/38, 95, 192, 197, 313; 200/61.62; 417/411, 234
See application file for complete search history.

(56) References Cited

U.S. PATENT DOCUMENTS 4,375,162 A * 3/1983 Eppley ..... 73/37
4,830,579 A * 5/1989 Cheng ..... 417/234
6,378,356 B1 * 4/2002 Ruiz et al. ..... 73/37
6,502,602 B1 * 1/2003 Stroup ..... 138/44
6,705,360 B1 * 3/2004 Bonzer ..... 141/38

* cited by examiner

*Primary Examiner*—Antoine D. Davis
(74) *Attorney, Agent, or Firm*—Lahive & Cockfield LLP

(57) CLAIM

The ornamental design for a compresssor test kit, as shown and described.

DESCRIPTION

FIG. 1 is a top view of a compressor test kit. The broken lines form no part of the claimed design.
FIG. 2 is a front view of a compressor test kit. The broken lines form no part of the claimed design.
FIG. 3 is a side view of a compressor test kit. The broken lines form no part of the claimed design; and,
FIG. 4 is a perspective view of a compressor test kit. The broken lines form no part of the claimed design.

1 Claim, 2 Drawing Sheets

Figure 1:
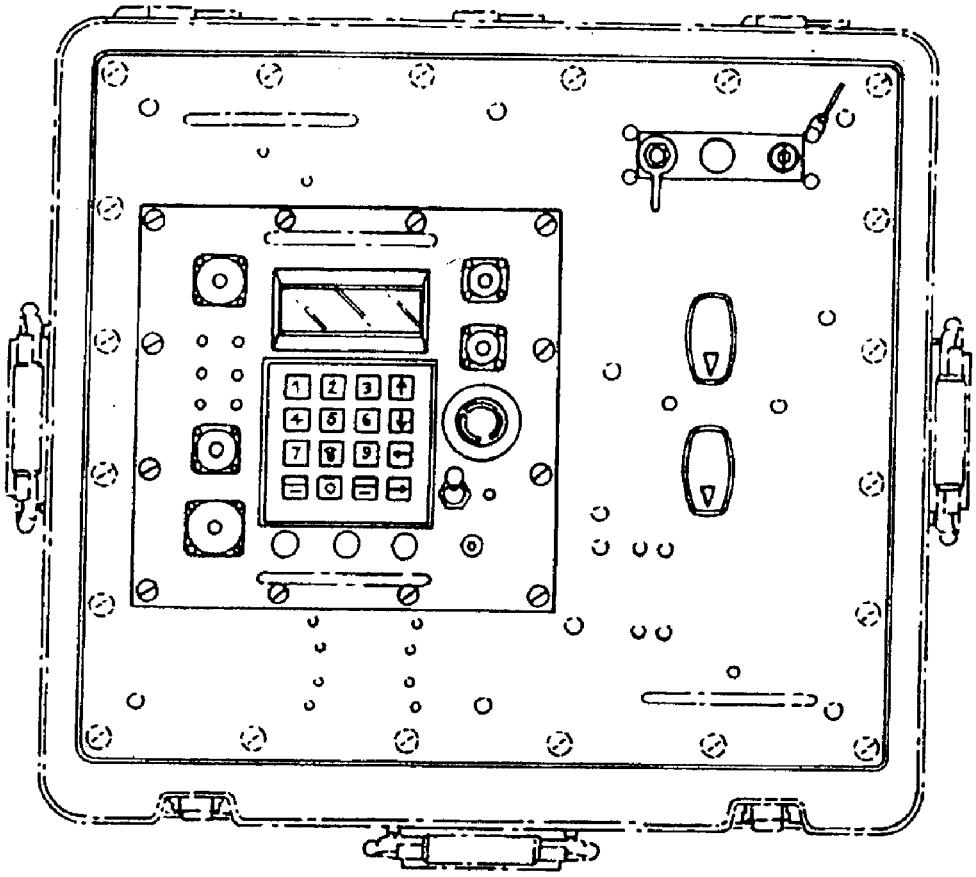
Figure 2:
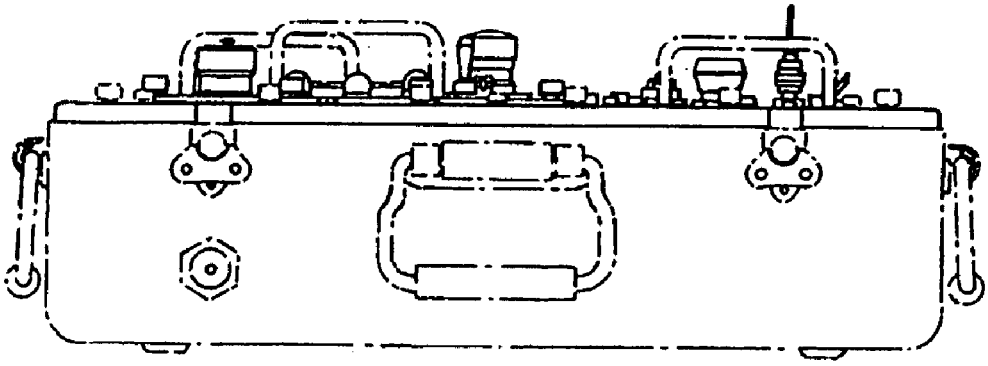
Figure 3:
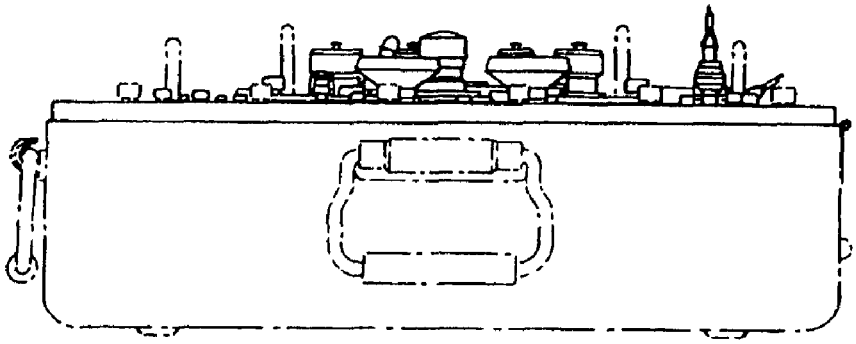
Figure 4:
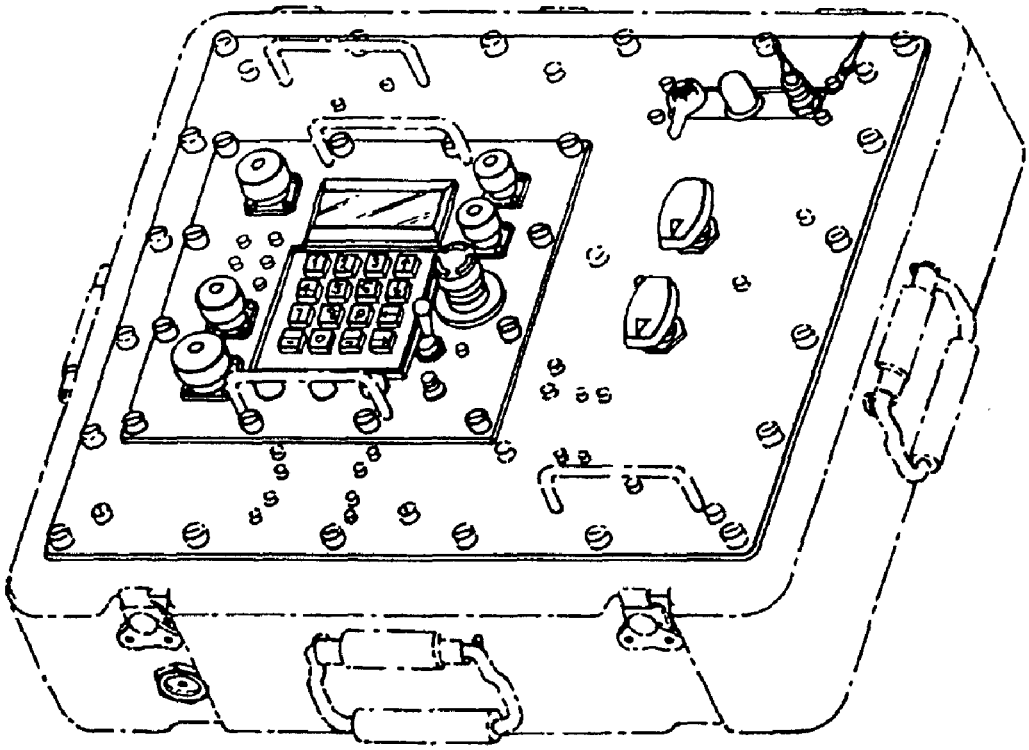

Matter enclosed in heavy brackets [ ] appears in the original patent, but forms no part of this reissue; matter printed in italics indicates the additions made by reissue.